Patented Jan. 9, 1934

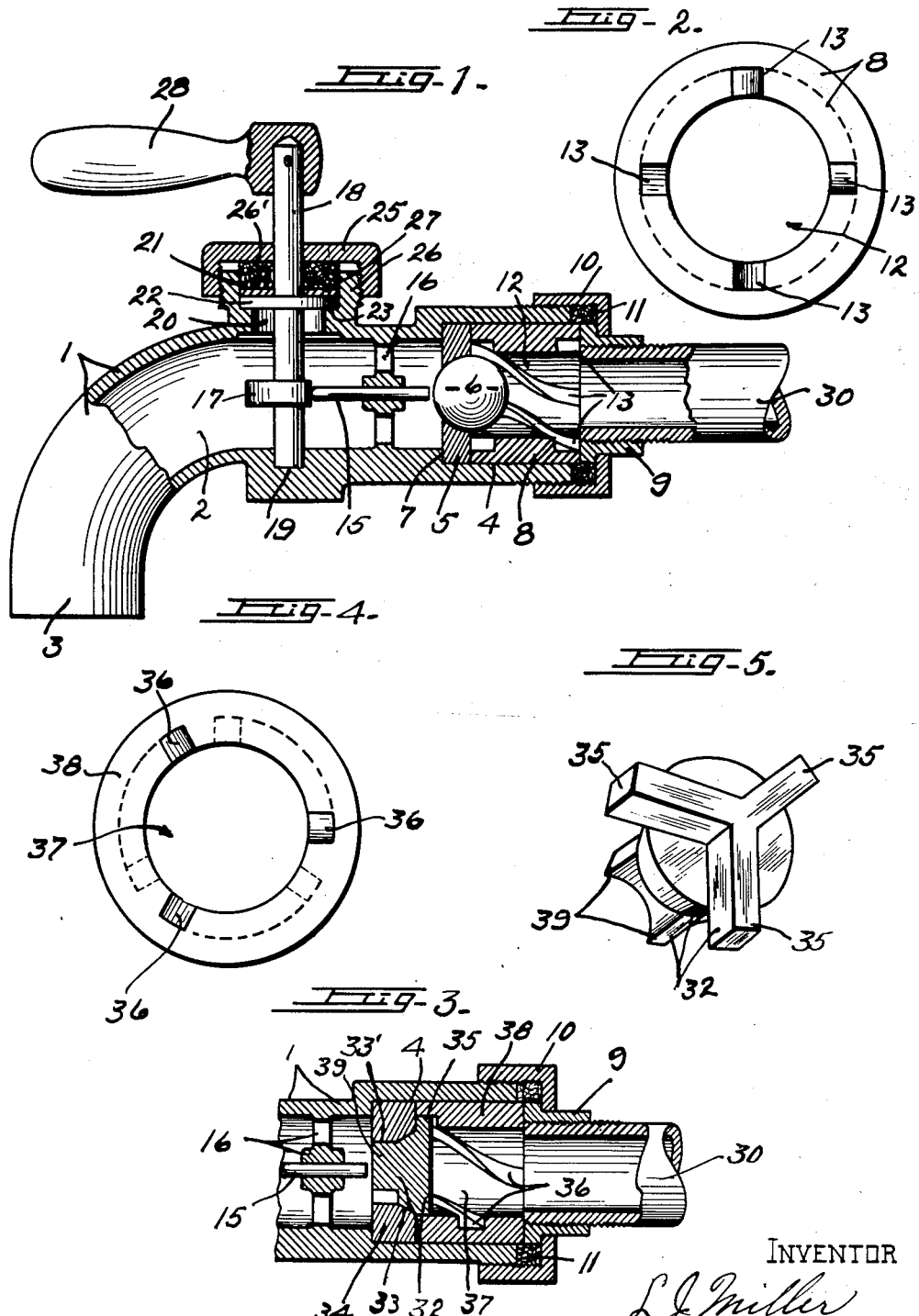

1,943,276

UNITED STATES PATENT OFFICE 1,943,276

FAUCET

Lewis J. Miller, Syracuse, N. Y., assignor of one-third to George E. Wiley

Application January 18, 1932. Serial No. 587,189

9 Claims. (Cl. 251—131)

This invention relates to certain new and useful improvements in faucets in which the valve is closed by fluid pressure when released by the operating mechanism.

The main object of this invention is to provide a faucet of the above-mentioned type in which the valve will be self-grinding and self-cleaning so as to always seat tightly and prevent the accumulation of corroded or other foreign substance on the valve and valve seat.

Another object is to provide for maximum pressure of the fluid on the rear or pressure side of the valve for causing the closing of the valve.

A further object is to produce a faucet in which the closing of the valve will be cushioned for the purpose of preventing pounding or water hammer.

A still further object is to provide a faucet in which the efficiency thereof will not be affected by expansion or contraction of the various metal parts thereof.

A still further object is to construct a faucet having a minimum number of parts, one which is durable in construction and which is so constructed as to be readily dis-assembled for repairs or replacements and in which the operating shaft may be easily packed while the valve is under pressure.

Other objects and advantages pertaining to the form and relation of the parts of the device will more readily appear from the following description, taken in connection with the accompanying drawing in which:

Figure 1 is a vertical longitudinal sectional view through the faucet with a portion of the nozzle and inlet pipe therefor shown in elevation.

Figure 2 is an end view of the valve guide shown in Figure 1.

Figure 3 is a detail longitudinal sectional view of the valve chamber illustrating a modified form of valve and valve guide.

Figure 4 is an end view of the valve guide illustrated in Figure 3.

Figure 5 is a perspective view of the valve shown in Figure 3.

As illustrated in Figures 1 and 2 of the drawing, the body 1 of the faucet is provided with a fluid passage 2 therethrough and has one end bent at substantially right angles to the remaining portion thereof to form a nozzle 3.

The end of the passage 2 opposite the nozzle 3 is slightly enlarged in diameter to form an annular recess or valve chamber 4 in which is removably positioned a valve seat 5 which, in this instance, is an annular ring member made of brass, rubber or other suitable material, and which has the central opening therethrough suitably formed for receiving the valve as 6.

The valve seat 5 is removably clamped in the end of the chamber 4 against a shoulder 7 formed by the enlargement of the passage 2 by means of a tubular valve guide member 8 positioned in the chamber 4 at the outer side of the valve seat 5. The valve guide 8 is of sufficient length to extend a relatively short distance beyond the inlet end of the body 1 and is removably clamped in position by a flanged bushing 9 which, in turn, is secured in place by a union nut 10 screw-threaded on the head end of the body 1.

Suitable packing 11 may, as shown, be positioned within the nut 10 about the valve guide 8 and inner end of the bushing 9 for preventing the escapement of fluid. The valve guide 8, in this instance, has a central opening 12 extending longitudinally therethrough and of slightly greater diameter than the diameter of the ball valve 6 for permitting the free outward axial movement of the valve from the seat 5.

In order that the valve may be self-cleaning and that different surface portions of the valve may successively engage the valve seat to obtain the maximum wear of the valve 6, the wall of the opening 12 through the valve guide is provided with a plurality of, in this instance four, peripheral spiral grooves or channels 13 which extend from one end of the guide to the other so that fluid as water flowing through and guided by the valve guide grooves and around the valve 6, when said valve is in the open position, will be given a spiral whirling motion as it leaves the valve guide and passes through the opening in the valve seat so that as the valve is permitted to be carried forwardly by the fluid pressure in closing, the valve in coming in contact with the whirling fluid will thereby be given a rotary movement as it impinges against the valve seat, and the valve seat and valve will thus be maintained in a clean, polished and uncorroded condition at all times.

The valve 6 may be moved from its seat by any suitable means which, in this instance, consists of a horizontally disposed pin or valve stem 15 slidably mounted in coaxial alignment with the valve seat in a transversely extending web portion 16 formed integral with the body 1 and which extends across the passage 2 a relatively short distance inwardly from the valve chamber 4. This pin 15 is actuated by a suitable cam 17 eccentrically secured to a vertically disposed shaft 18 which has its inner end journaled in a suitable bore 19 provided in the body 1 adjacent the lower surface of the passage 2 and extends upwardly through an opening 20 formed in alignment with the bore 19 in the upper wall of the body 1.

The outer end of the opening 20 is somewhat enlarged in diameter to form an inwardly extending recess 21 for receiving a collar 22 secured to the shaft 18 and which is adapted to engage the upper surface of a shoulder 23 formed at the inner end of said recess for rotatably supporting the upper end of the shaft 18. The shaft 18 may be maintained against axial movement by a suitable nut 25 screw-threaded on a suitable upwardly extending boss 26 formed on the body 1 of the faucet surrounding the recess 21, and in order to prevent leakage around the shaft, suitable packing as 26' may be provided between the inner face of the nut and the collar 22.

A wearing washer 27 is positioned between the packing 26 and the collar 22 to permit easy turning of the shaft. The shaft 18 extends upwardly through a suitable aperture located centrally in the nut 25 and has secured to the upper end thereof a suitable handle 28 which may be utilized in turning the shaft 18 and cam 17.

In order that the faucet may be readily attached to a fluid supply conduit, the flanged bushing 9 is internally threaded for engaging a suitable supply pipe 30 which has the opening therethrough of less diameter than that of the valve 6 so that when the pipe 30 is secured in operative engagement with the faucet, the valve 6 will be prevented from being carried outwardly through the valve guide 8 by any back flow of fluid which may occur by said pipe 30.

When it is desired to use the faucet, the handle 28 may be actuated to turn the shaft 18 substantially one-half revolution or 180° which action will turn the cam 17 rearwardly into engagement with the pin 15 and thereby move the pin rearwardly and force the valve 6 outwardly against the pressure of the fluid in the valve guide opening 12 and pipe 30. The fluid in the pipe 30 may now flow through the valve guide opening 12 and channels 13 in said guide around the valve 6 and out through the valve seat and nozzle 3 of the faucet.

When it is desired to close the faucet, the handle 28 may again be manipulated to bring the cam 17 to its original forward position. During this action of the cam, the pressure of the fluid acting upon the rear surface of the valve 6 will cause the valve and pin 15 to follow the cam member 17, and as the valve approaches the seat 5, the spirally rotating fluid passing through the seat will engage the ball valve 6 and cause said valve to rotate as it impinges against the seat, thereby preventing corrosion to accumulate on either the valve or the valve seat and maintain them in a smooth polished condition, thereby insuring the perfect seating of the valve and preventing leakage.

The valve stem or pin 15, in this instance, is of slightly shorter length than the distance between the valve and the adjacent cam surface when the cam is in the forward position so that any variation in the size of the valve or the co-operating parts, due to the expansion or contraction, will not affect the perfect seating of the valve.

In Figures 3, 4 and 5, there is shown a modified form of valve and valve seat and guide member for said valve. The valve 32, as shown, is a substantially flat member having a conical peripheral edge adapted to engage a correspondingly conical surface 33 provided in the valve seat 34, and has the outer or pressure side thereof provided with a plurality of, in this instance three, radially disposed guide arms 35 which extend a short distance beyond the outer edge of the valve proper for engaging in respective grooves 36 formed in the peripheral wall of the valve guide opening 37 of a valve guide 38.

The grooves or channels 36 in the valve guide 38, like the grooves in the valve guide 8, extend spirally from one end of the guide member to the other so that as the valve 32 is moved axially towards or from the valve seat 34, the valve will also have a rotary movement because of its positive association with the guide which, as the valve impinges against the seat, will maintain the seat and valve in a polished condition.

In order that the valve 32 may be maintained in an upright position during the axial movement thereof, the inner portion 33' of the opening through the valve seat 34 is made cylindrical for guiding inwardly extending arms 39 formed on the inner or exhaust side of the valve 32 and which have an easy sliding fit in said cylindrical portion 33' of the valve seat.

Although I have shown and particularly described the preferred embodiment of my invention, I do not wish to be limited to the exact construction shown as various changes in the form and relation of the parts thereof may readily be made without departing from the spirit of this invention as set forth in the appended claims.

I claim:

1. In a faucet of the class described, a casing having a fluid passage therethrough and provided with a valve seat in said passage, a valve movable axially into and out of engagement with said seat, a valve guide positioned adjacent the seat for maintaining the valve in substantially co-axial alignment with said seat, said guide being provided with spiral grooves, and arms associated with the valve adapted to travel in said grooves for rotating the valve during the axial movement thereof.

2. In a faucet of the class described, a casing having a fluid passage therethrough and provided with a valve seat in said passage, a ball valve movable axially into and out of engagement with said seat, fluid guide means including a spiral groove adapted to produce a rotary motion to the fluid as it passes through the seat whereby the valve will be rotated as it impinges against said seat.

3. In a faucet of the class described, a casing having a fluid passage therethrough and provided with a valve seat in said passage, a ball valve movable axially into and out of engagement with said seat, a tubular valve guide positioned adjacent the seat for maintaining the valve in substantially co-axial alignment with said seat, and means associated with said guide including a spiral groove in the inner surface thereof for producing a rotary motion to the fluid as it passes through the seat whereby the valve will be rotated as it impinges against said seat.

4. In a faucet of the class described, a casing having a fluid passage therethrough and provided with a valve seat in said passage, a valve movable axially into and out of engagement with said seat, a valve guide positioned adjacent the seat for maintaining the valve in substantially co-axial alignment with said seat, and co-operating means positively associated with said valve and guide whereby the valve will be rotated during said axial movement.

5. In a faucet of the class described, a casing having a fluid passage therethrough and provided with a valve seat in said passage, a valve member movable axially into and out of engagement with said seat, a guide member for maintaining the valve in substantially co-axial alignment with said seat, spiral means consisting of a groove in one of said members, and an arm connected with the other member adapted to travel in said groove for rotating the valve as it impinges against said seat.

6. In a faucet of the class described, a casing having a fluid passage therethrough and provided with a valve seat in said passage, a valve member movable into engagement with said seat by forward pressure of fluid, and means including a spiral groove in the wall of said passage for coacting with the fluid for producing rotary movement of the valve as said valve engages said seat.

7. In a faucet of the class described, a casing having a fluid passage therethrough and provided with a valve seat in said passage, a valve member movable into engagement with said seat by forward pressure of fluid, and fluid guide means including a spiral groove in the wall of said passage adapted to produce a rotary motion to the fluid as said fluid passes through the seat whereby the valve will be rotated as it impinges against said seat.

8. A faucet of the class described comprising in combination a casing having a fluid passage therethrough and provided with a valve seat in said passage, a valve member movable into engagement with the valve seat by forward pressure of fluid, and means comprising a plurality of spiral grooves in the wall of said passages adapted to cooperate with the forward movement of fluid for rotating the valve as it impinges against said seat.

9. A faucet of the class described comprising in combination a casing having a fluid passage therethrough and provided with a valve seat in said passage, a valve member movable into engagement with the valve seat by forward pressure of fluid, and means comprising a plurality of spiral grooves in the wall of said passages adjacent the valve seat adapted to cooperate with the forward movement of fluid for rotating the valve as it impinges against said seat.

LEWIS J. MILLER.